United States Patent
Zalzalah et al.

(10) Patent No.: US 7,546,361 B2
(45) Date of Patent: Jun. 9, 2009

(54) METHOD AND NETWORK FOR DELIVERING MANAGEMENT SOFTWARE FOR A NETWORK ELEMENT

(75) Inventors: Luay Zalzalah, Nepean (CA); Alain Drolet, Gatineau (CA); Craig Parker, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 840 days.

(21) Appl. No.: 10/837,975

(22) Filed: May 3, 2004

(65) Prior Publication Data

US 2005/0097216 A1    May 5, 2005

Related U.S. Application Data

(60) Provisional application No. 60/510,631, filed on Oct. 10, 2003.

(51) Int. Cl.
*G06F 15/173* (2006.01)
(52) U.S. Cl. ........................ 709/223; 709/224; 717/168; 717/174
(58) Field of Classification Search ................ 709/223, 709/224, 203; 717/168, 173, 170–171, 174, 717/177, 178, 172
See application file for complete search history.

(56) References Cited

U.S. PATENT DOCUMENTS

| | | | | |
|---|---|---|---|---|
| 5,742,829 | A * | 4/1998 | Davis et al. | 717/178 |
| 6,108,703 | A * | 8/2000 | Leighton et al. | 709/226 |
| 6,510,439 | B1 * | 1/2003 | Rangarajan et al. | 707/201 |
| 6,523,027 | B1 * | 2/2003 | Underwood | 707/4 |
| 6,883,169 | B1 * | 4/2005 | Guilbeault et al. | 717/178 |
| 7,058,843 | B2 * | 6/2006 | Wolf | 714/4 |
| 7,120,684 | B2 * | 10/2006 | Lawing et al. | 709/223 |
| 7,149,698 | B2 * | 12/2006 | Guheen et al. | 705/1 |
| 7,155,462 | B1 * | 12/2006 | Singh et al. | 707/203 |
| 2002/0032640 | A1 * | 3/2002 | LaFore et al. | 705/37 |
| 2003/0066065 | A1 * | 4/2003 | Larkin | 717/177 |
| 2003/0131087 | A1 * | 7/2003 | Shippy et al. | 709/223 |
| 2004/0088700 | A1 * | 5/2004 | Lee et al. | 717/178 |
| 2004/0216099 | A1 * | 10/2004 | Okita et al. | 717/168 |
| 2005/0027846 | A1 * | 2/2005 | Wolfe et al. | 709/223 |
| 2005/0183021 | A1 * | 8/2005 | Allen et al. | 715/747 |

* cited by examiner

*Primary Examiner*—Frantz B Jean
(74) *Attorney, Agent, or Firm*—Kent Daniels; Blake, Cassels & Graydon LLP (57) ABSTRACT

A method and network for delivering management software from a network element to a client computer so that the client can configure and manage the network element. The network element includes a master software load and a management software load. The master software load includes software instructions for: enabling the client to log into the network element; and, if the client successfully logs into the network element, forming a management connection between the client and the network element and transferring to the client a current version of management software for execution on the client. The client can then host and execute the management software so that a user can direct operations, administration, and maintenance (OAM) of the network element.

6 Claims, 7 Drawing Sheets

METHOD AND NETWORK FOR DELIVERING MANAGEMENT SOFTWARE FOR A NETWORK ELEMENT

RELATED APPLICATION

This application claims the benefit of U.S. Provisional Patent Application No. 60/510,631, filed on Oct. 10, 2003, the entire teachings of which are incorporated herein by reference.

FIELD OF THE INVENTION

The invention relates generally to the distribution and installation of management software for a network element. In particular, the invention relates to the delivery of operations, administration and maintenance (OAM) software, including a graphical user interface, from a network element to a client to enable configuration and management of the network element.

BACKGROUND

Network elements are used in communications networks to control communications traffic along various data paths. Operations, administration and maintenance (OAM) software (i.e., management software) is used to manage the operation of the network elements. Typically, the management software is delivered to the user on a compact disc (CD), tape or some other form of tangible media. The user is responsible for installing the software on a client device and associating it with the appropriate network element. The software executes locally on the client machine (e.g., personal computer (PC)).

Various versions of the management software may be available to the client. An incorrect version can be incompatible with the network element or may not provide some of the features of more recent versions. Thus the user must implement software asset tracking to ensure the correct version is installed and executing on the client.

A network element can execute the management software locally and communicate with the client to transfer network element data and to receive configuration data and commands. In this manner, the client always interacts with the proper version of the management software for the network element; however, significant bandwidth and resources of the network element are consumed.

Thus there remains a need for a method to reliably install and execute the proper type and version of management software for a network element on a client. The method should minimize the need for software asset tracking and should not significantly reduce the available resources of the network element. The present invention satisfies these needs and provides additional advantages.

SUMMARY OF THE INVENTION

In one aspect, the invention features a network for delivering management software. The network includes a network element and a client that is in communication with the network element. The network element manages communications traffic and includes a master software load that includes a management software load. The network element transfers the management software load from the network element to provide to the client a transferred version of the management software, which is based on the management software load and proper for interfacing with the network element. The client installs and executes the transferred version of the management software to manage the network element. In one embodiment of the invention, the management software load includes a stored version of a Java application, and the transferred version of the management software includes a transferred version of the Java application. In another embodiment, the management software load includes a stored version of a graphical user interface (GUI) application, and the transferred version of the management software includes a transferred GUI application that enables a user at the client to manage the network element.

In another aspect, the invention features a network element that manages communications traffic and delivers management software for the network element. The network element includes a master software load including a management software load and a processor loaded with the master software load. The processor hosts and executes the master software load to configure the processor to receive a request from a client in communication with the network element to transfer the management software, and to provide to the client a transferred version of the management software that is based on the management software load and proper for interfacing with the network element. The transferred version of the management software enables the client to manage the network element. In one embodiment, the management software load includes a stored version of a Java application, and the transferred version of the management software includes a transferred version of the Java application. In another embodiment, the management software load includes a stored GUI application, and the transferred version of the management software includes a transferred GUI application. The transferred GUI application, when hosted and executed at the client, enables a user at the client to manage the network element.

In another aspect, the invention features a method for delivering software from a network element that manages communications traffic to a client to manage the network element. The method includes (if the client establishes communication with the network element) transferring management software accessed at the network element to the client to provide a transferred version of the management software proper for interfacing with the network element; installing the transferred version of the management software on the client; and executing the transferred version of the management software at the client to manage the network element. In one embodiment of the method, transferring the management software includes establishing a communications channel over an intervening network between the client and the network element. In another embodiment, the method further includes installing a master software load on the network element. The master software load includes a management software load. Transferring the management software includes accessing the management software load at the network element.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the invention relates to a method of delivering operations, administration and maintenance (OAM) software (i.e., management software) for a network element such as a communications shelf used to manage communications traffic in a communications network. The transferred version of the management software (also termed "site manager" software) is retrieved from the network element to be managed, thus problems associated with installing a version of the management software from media local to the client, such as software version tracking, are avoided. Moreover, only clients that actually communicate with the network element receive the management software. As a result, the need to distribute the management software to all clients that potentially will manage the network element is eliminated.

Figure 1:
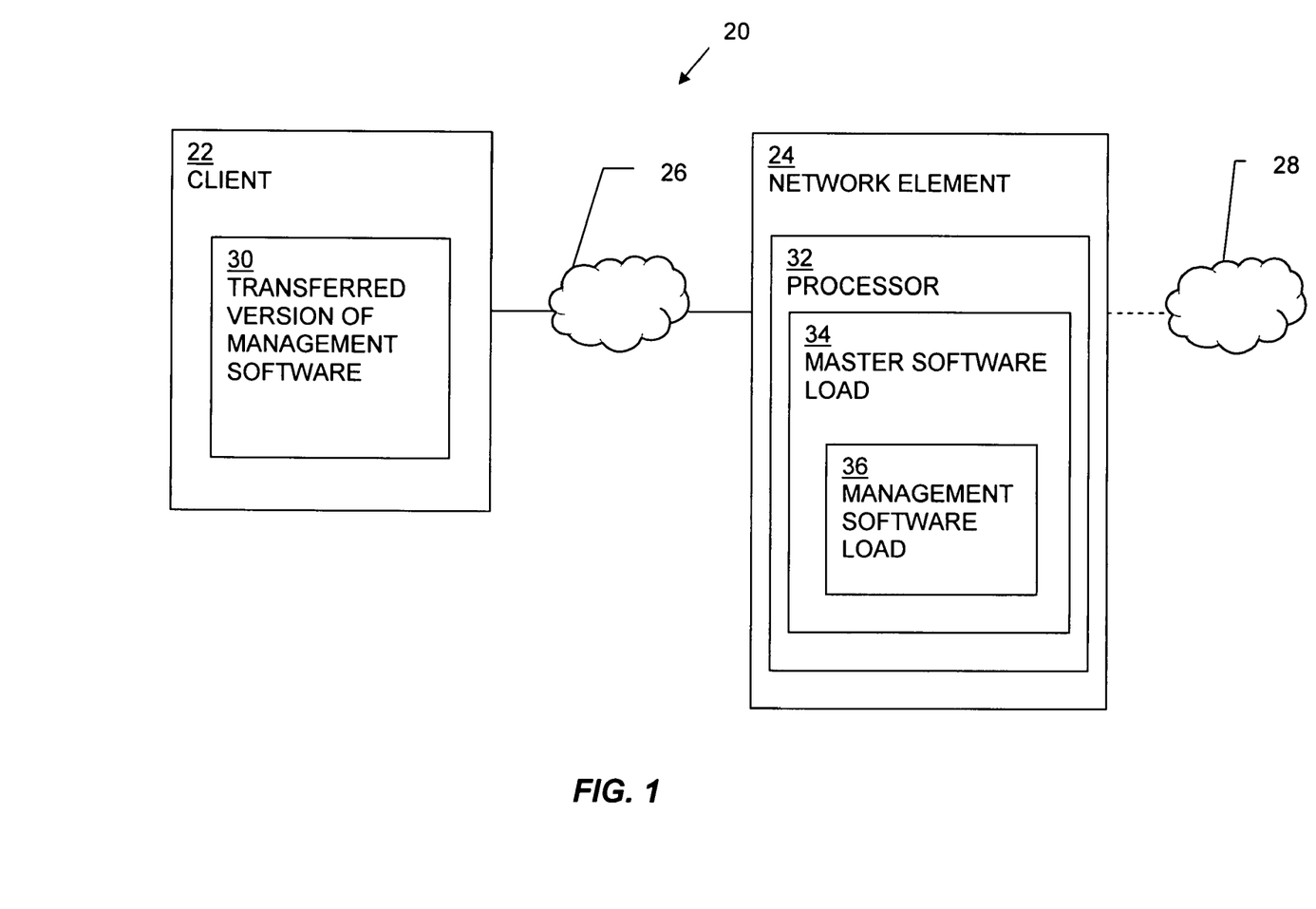
FIG. 1 is a functional block diagram of a simple networked environment including a client and a network element according to one embodiment of the invention.

FIG. 1 depicts a functional block diagram of a simple networked environment 20 suitable for one embodiment of the invention. The simple networked environment 20 includes a client 22 and a network element 24, which are connected by a network, such as an intervening network or intranet 26. The network element 24 manages communication traffic in a communications network 28. The client 22 has received a transferred version of the management software 30. The network element 24 includes a processor 32 that is loaded with a master software load 34 that includes a management software load 36.

The client 22 is a digital computer suitable for hosting and executing the transferred version of the management software 30 and thus serving as a network manager capable of managing devices on a network, such as the network element 24. In one embodiment, the client 22 is a PC (personal computer). In other embodiments, the client 22 is a desktop, laptop, PDA (personal digital assistant), palmtop, server, workstation, minicomputer, or other suitable digital computer capable of serving as a network management device that can execute the transferred version of the management software 30 to manage the network element 24. The client 22 typically includes one or more microprocessors (not shown), and a volatile memory (e.g., RAM or random access memory) (not shown) and/or nonvolatile memory (e.g., nonvolatile hard disk or integrated circuit (IC) memory chip) (not shown) for storing the instructions of the transferred version of the management software 30 that are hosted and executed by the one or more microprocessors of the client 22. The instructions configure the client 22 to perform the functions of the transferred version of the management software application 30 (e.g., Java application) to configure and manage the network element 24. As used herein, the term "manage" refers to providing one or more of operations, administration, and maintenance functions for a device (e.g., the network element 24).

The network element 24 is a device that manages traffic on a network (e.g., communications network 28), such as a network switch device and/or gateway network device. In various embodiments of the invention, the network element 24 is any suitable type of computing device, such as a PC, desktop computer, workstation, server, or other computing device configured to provide switching, gateway, and/or other network traffic management functions. In one embodiment, the network element 24 is a multiservice switch that coordinates different types of communications traffic, such as TDM (time-division multiplexed) traffic, packet transport traffic, and transparent wavelength traffic.

The intranet 26 is a network or an intervening network between the client 22 and network element 24. The intranet 26 is typically a network providing information processing and data communications within a company or organization. In one embodiment, the intranet 26 is based on a packet switching network, such as an Internet Protocol (IP). The intranet 26 is not limited to connecting one client 22 and network element 24, as illustrated in FIG. 1, but may connect two or more clients 22 and network elements 24 (see FIGS. 2, 4, and 5). The intranet 26 is not limited to a particular type of network, but can be any network or connecting communications line suitable for connecting a client 22 and a network element 24.

The communications network 28 is a network suitable for handling communications traffic of different types, including telecommunications, data, network packet, and/or other communications types, based on but not limited to optical cable, metallic wire (e.g., copper), and wireless connections.

The processor 32 is, in one embodiment, a processor board, such as a printed-circuit board including a microprocessor (not shown) and memory (not shown). In one embodiment, the processor 32 is a shelf processor for managing a communications shelf for the communication network 28. In one embodiment, the processor 32 operates in conjunction with other components or printed-circuit boards, such as those receiving input for and providing output for different types of communications traffic (e.g., tributary cards), and those providing links or coordination between components within a communications shelf (e.g., cross-connect cards).

The master software load 34 is loaded onto the hardware (e.g., processor 32) of the network element 24 to permit software control of the network element 24. Typically, the master software load 34 includes software instructions stored in a memory on the processor 32, and hosted and executed by one or more microprocessors located on the processor 32. The instructions configure the processor 32 to perform the various functions of the network element 24 described herein, such as receiving a request from the client 22 to transfer the management software 30, performing the transfer of the management software 30 to the client 22, and managing communication traffic in the communications network 28.

For example, the master software load 34 enables and controls the transfer of the management software load 36 from the network element 24 to the client 22. In one embodiment, the master software load 34 and the management software load 36 are typically stored in a volatile memory (e.g., RAM or random access memory) and/or nonvolatile memory (e.g., hard disk or IC memory chip) on the board of the processor 32. In another embodiment, the master software load 34 and management software load 36 are stored in a memory (not shown) located elsewhere in the network element 24 than on the processor 32. Transferring the management software by using the network element 24 is an approach that provides for the comparison of the version levels of the management software 30 on the management host (e.g. client 22) and of the version level of the management software load 36 on the network element 24 to detect any conflict. Alternatively, the management software load 36 can be distributed by using CD's (compact disks) or other readable disk or readable media technology or by using the web.

In one embodiment, the master software load 34 and management software load 36 are object code, machine code, or other compiled computer source code, as well as other non-compiled files (e.g., XML configuration files). For example, the management software load 36 is a Java application, provided as Java bytecode. Alternatively, the management software load is a platform-independent application, such as a Python application, or an application compiled for a specific platform, such as a C++ application compiled for a specific platform (i.e., operating system). In other embodiments, the management software load 36 is stored in other formats, such as a compressed file, encrypted file, data in a database, assembly language code, or other format suitable for storage of software instructions and code.

In one embodiment, the management software load 36 includes a Java application stored on the network element 24. In another embodiment, the management software load 36 includes a graphical user interface (GUI) application stored on the network element 24.

For one embodiment of the invention, the management software load 36 is included in a software load (e.g., master software load 34) provided to the processor 32 of the network element 24 prior to deployment in the communications network 28. In another embodiment, the master software load 34 and the management software load 36 are separate software components or programs loaded onto the processor 32; that is, the management software load 36 is separate from and not part of the master software load 34. The user can use a personal computer (e.g., PC) 22 or other network management device 22 to "pull" the management software 30 from the network element 24 for local installation on the client 22 (e.g., PC). This process of pulling the management software 30 eliminates the need for CDs or other hard media and the associated manual installation of the management software 30 at the client 22.

Figure 2A:
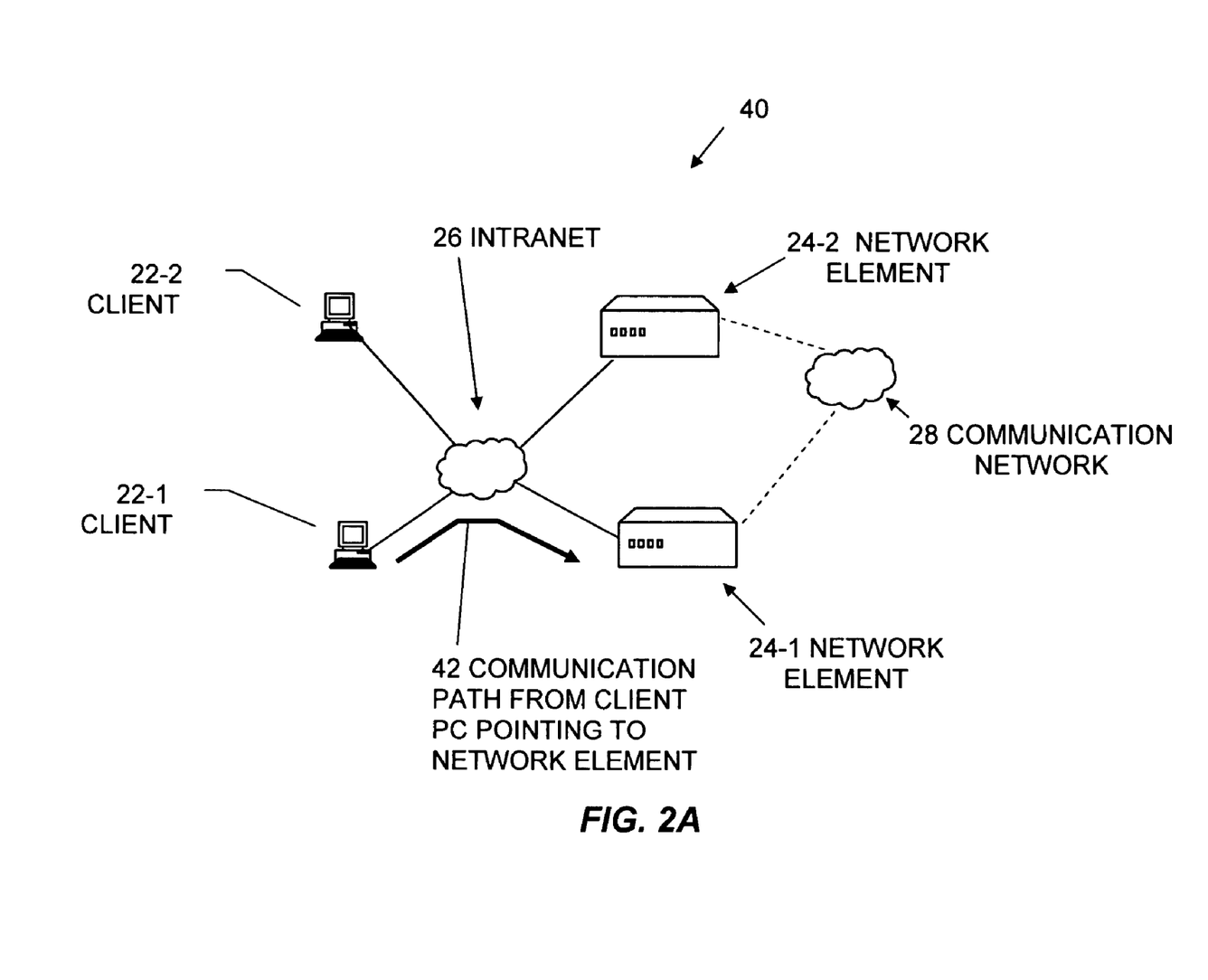
FIGS. 2A, 2B, and 2C are views of a complex networked environment showing a process of transferring management software to a client through an intranet from a network element according to one embodiment of the invention.
Figure 2B:
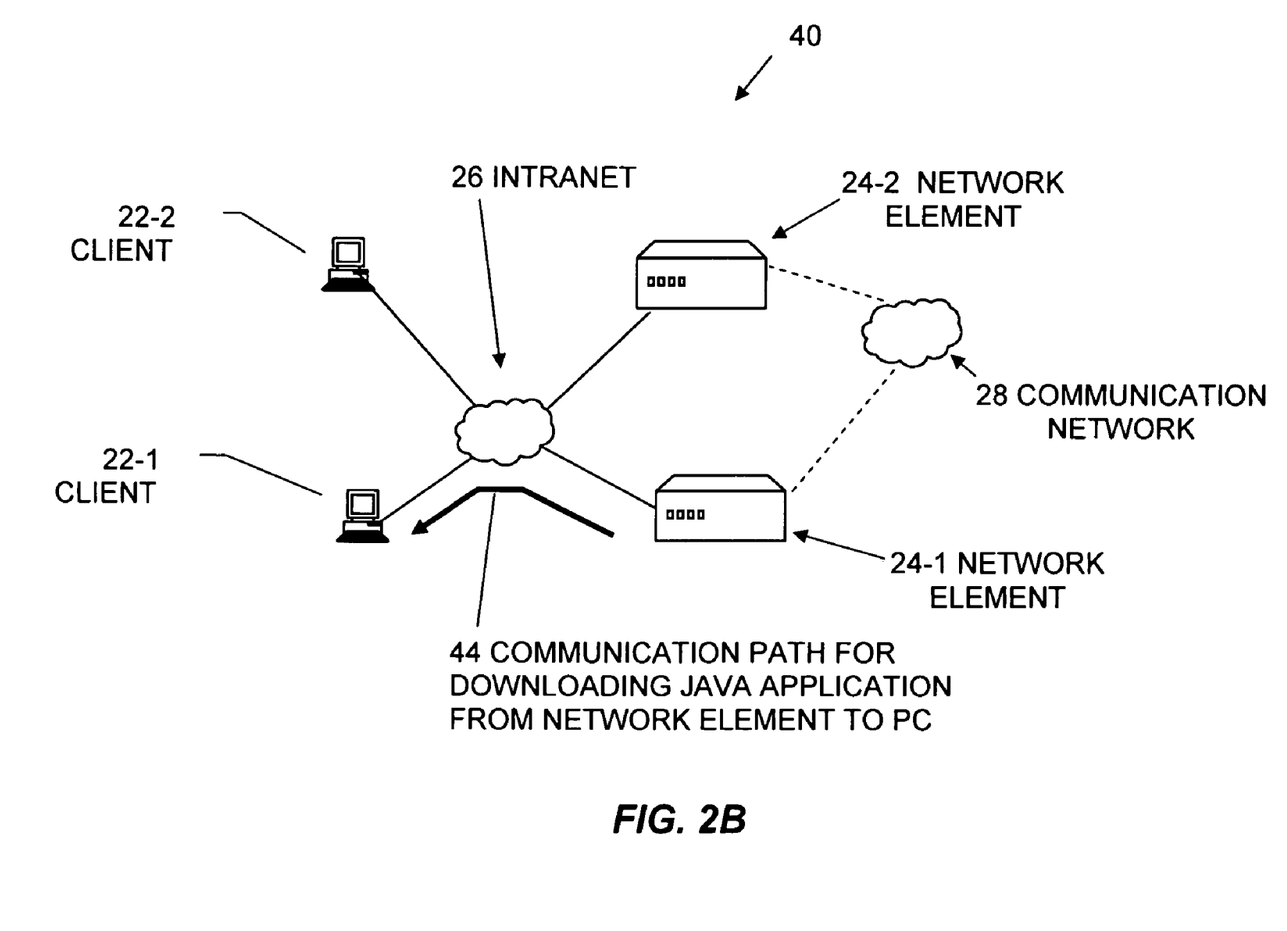
Figure 2C:
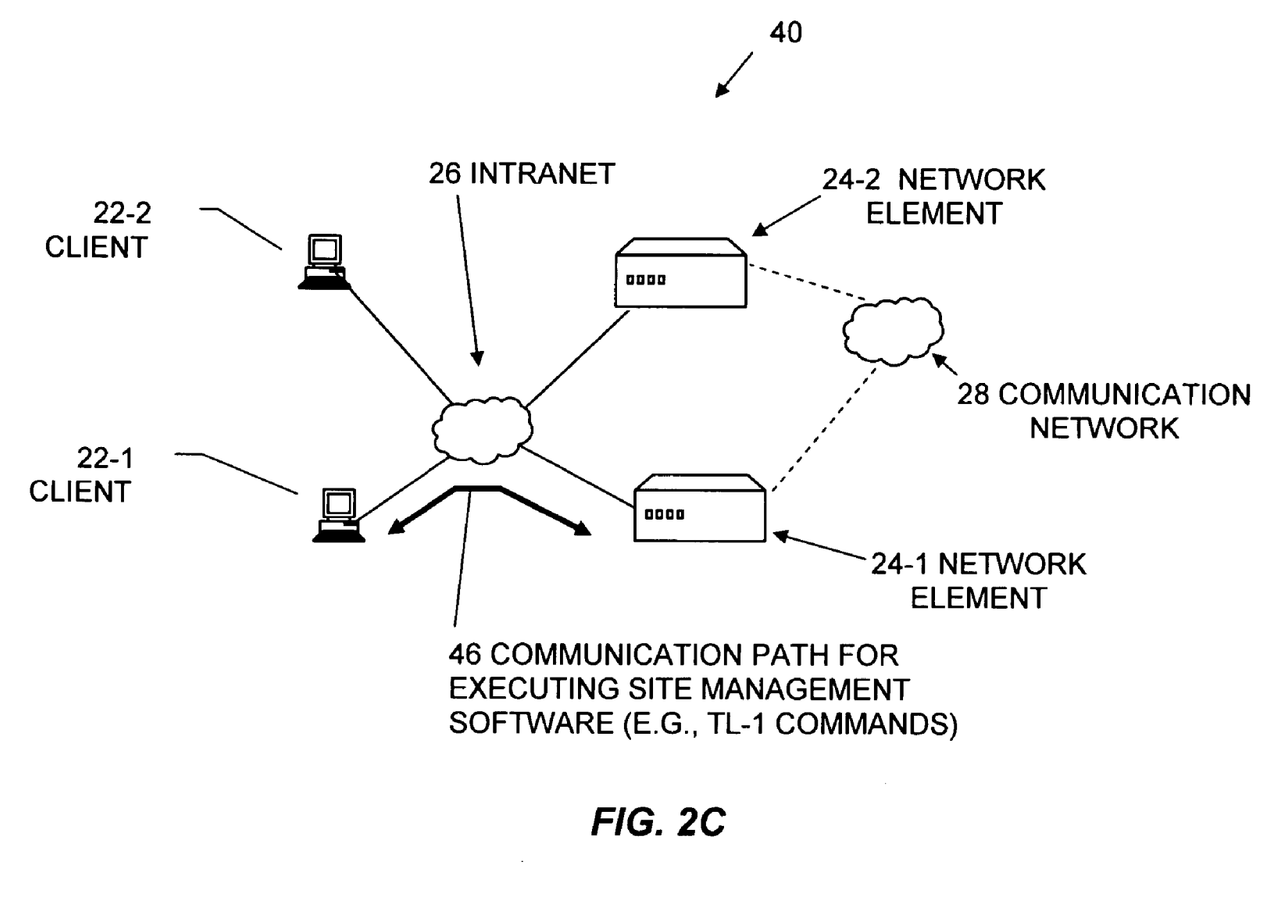
Figure 3:
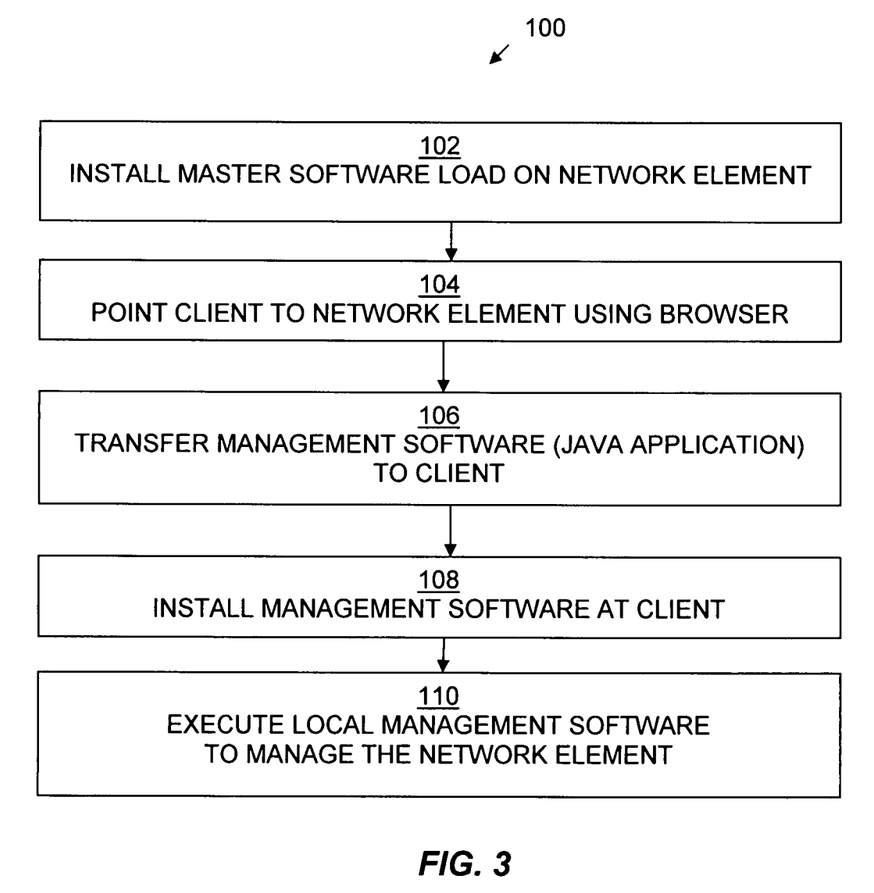
FIG. 3 is a flowchart of a procedure for transferring management software according to one embodiment of the invention.

FIGS. 2A, 2B, and 2C depict the process of obtaining a transferred version of the management software 30 through an intranet 26 from a network element 24-1, and FIG. 3 illustrates a method 100 of providing the transferred version of the management software 30 to a client 22 (e.g., PC). More specifically, FIGS. 2A, 2B, and 2C provide views of a complex networked environment 40 that includes network elements 24-1 and 24-2 (instances of the network element 24 of FIG. 1), and clients 22-1 and clients 22-2 (instances of the client 22 of FIG. 1). The network elements 24-1 and 24-2 are able to communicate with the clients 22-1 and 22-2 through the intranet 26. The network elements 24-1 and 24-2 are also part of the communication network 28.

FIG. 2A shows a communication path 42 that provides an initial connection over the intranet 26 from the client 22-1 (e.g., PC) pointing to the network element 24-1. FIG. 2B shows a communication path 44 for downloading a Java application (an embodiment of the transferred version of the management software 30) from the network element 24-1 to the client 22-1. FIG. 2C shows a communication path 46 for executing site management commands directed from the client 22-1 to the network element 24-1. In one example, the site management commands are TL-1 (Transaction Language One) commands to configure and manage the network element 24-1.

Referring now also to FIG. 3, the master software load 34 is installed (step 102) on the network element 24-1. A user points (step 104) the client 22-1 to the network element 24-1 using a browser (e.g., Internet browser). For example, a network technician uses a client 22-1 (e.g., laptop computer) at a CO (central office) to connect to a network element 24-1, and log into the network element 24-1. The network element 24-1 is thus able to identify and verify the laptop computer as the client 22-1. The client 22-1 then issues a command (e.g., TL-1 command) that will trigger the network element 24-1 to deliver a compatible management client load (e.g. management software 30). Alternatively, the user can use other approaches to communicate a request to transfer the management software 30, such as sending an electronic mail message, an instant message, an FTP (File Transfer Protocol) request to transfer a file, or other suitable software mechanism to initiate a request from one computer to another. In another embodiment, the client 22-1 is programmed to make the request to transfer the management software 30 when the client 22-1 boots or starts up. In another embodiment, the request to transfer the management software 30 is a request to check that the client 22-1, which may already have a version of the transferred management software 30, has a version that is proper for the network element 24-1, and to retrieve the proper transferred version of the management software 30 only if the client 22-1 does not have a proper version.

The network element 24-1 transfers (step 106) to the client 22-1 the management software 30 (e.g., Java application) based on the management software load 36 available (e.g., stored) on the network element 24-1. As a security precaution, the network element 24-1 typically initiates the transfer connection (e.g., using FTP), but only after the client 22-1 forms a management connection and requests the transfer (as described earlier for step 104). Alternatively, the network element 24-1 initiates the communication connection to the client 22-1 using suitable security measures, and initiates the transfer of the management software load 36. The user installs (step 108) the transferred version of the management software 30 at the client 22-1. In another embodiment, the client 22-1 is programmed to install the transferred version of the management software 30 without further intervention by the user, or the transferred version of the management software 30 is self-installing on the client 22-1. In another embodiment, the client 22-1 is programmed to perform steps 104, 106, and 108 without step-by-step or proactive involvement by a user. After installation is complete, the client 22-1 hosts and executes (step 110) the local management software (that is, transferred version of the management software 30) to manage the network element 24-1.

From the perspective of the user, the network element 24-1 acts as a server that delivers the transferred version of the management software 30, including a graphical user interface (GUI), for managing the network element 24-1. That is, the client 22-1 retrieves a stored version of the GUI application from the network element 24-1. The user "points" the client 22-1 to the network element 24-1 using, for example, an Internet browser, and retrieves the site management software 30 including a GUI as a Java application. That is, the client 22-1 retrieves a stored version of the Java application from the network element 24-1. This process of retrieving a transferred version of the management software 30 eliminates the need to execute at the network element 24-1 a graphical or text based program for providing full screen mode. Instead, the software management application 30 (transferred version of the Java application) is hosted and executed locally on the client 22-1 or client workstation 22-1. Consequently, the use of bandwidth and resources at the network element 24-1 is limited. The management software 30 (i.e., the management client application including the GUI) utilizes the same underlying command structure (e.g., TL-1) for interfacing with the network element 24-1 as management software versions installed manually onto the client 22-1 from hard media.

Advantageously, the described approach for delivering the management software 30 (for example, see FIG. 3) eliminates many of the problems associated with the distribution of management software on hard media. In addition, version checking is inherent in the delivery approach. The correct version for the network element manager (transferred version of the management software 30) is automatically provided to the user of a client 22 without the concern that an earlier version may be unintentionally implemented, thus minimizing the management and tracking of software assets for the network element 24 at the client 22. In one embodiment, this means that the client 22 can transfer the transferred version of the management software 30 independently of software asset tracking for the network element 24, because the client 22 is not necessarily required to track which version of the management software that the network element 24 has, but can retrieve the version of the management software that is available in the management software load 36, since the client 22 will thus receive a proper version of the transferred management software 30. In one embodiment, the client 22 need track only minimal data, such as which version of the management software is currently installed on the client 22 (as the transferred version of the management software 30) and which network element 24 provided the transferred version of the management software 30.

Figure 4:
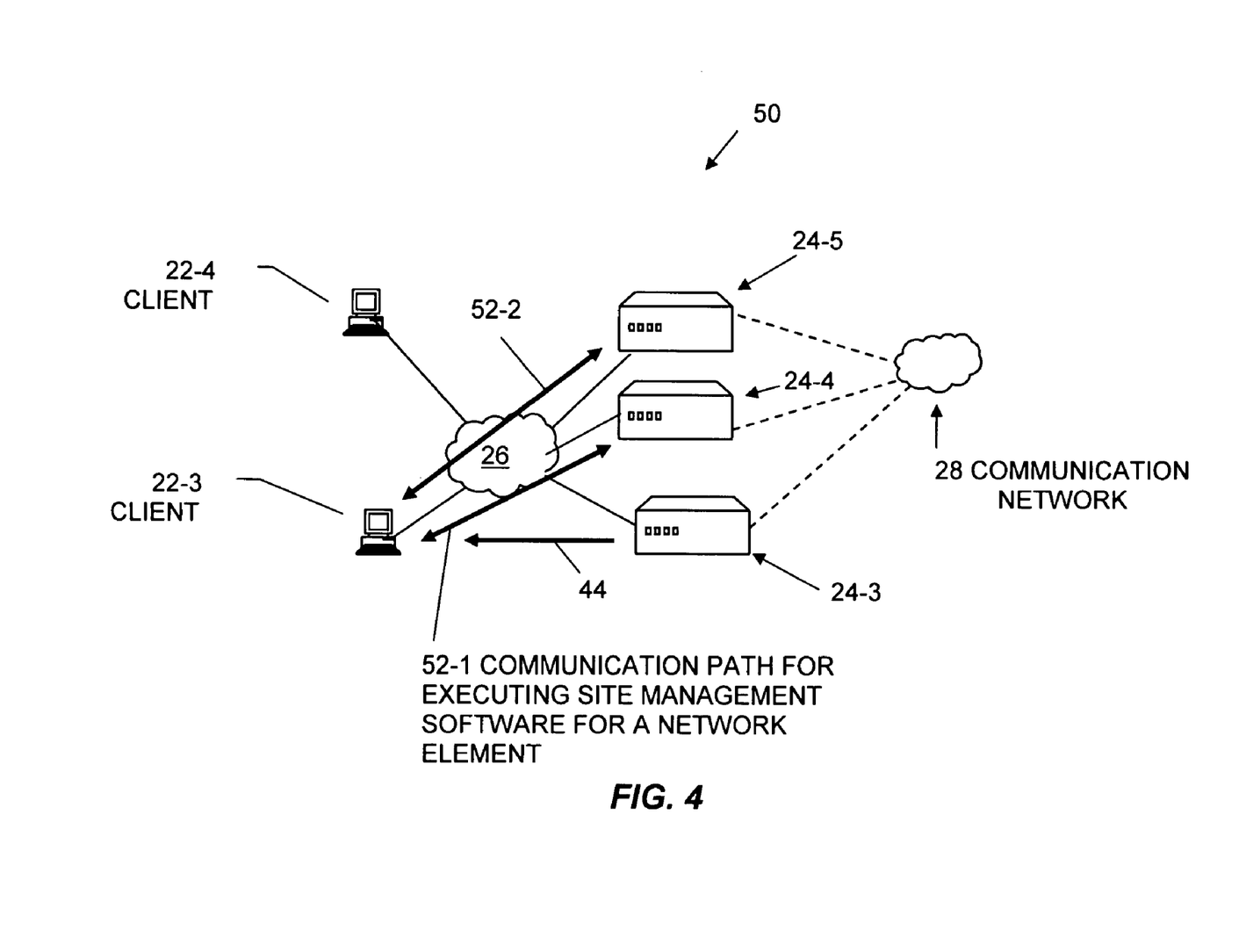
FIG. 4 is an illustration of a complex networked environment showing a communication path for management of multiple network elements by one client according to one embodiment of the invention.

FIG. 4 is an illustration of the management of a network element 24-4 in a complex networked environment 50 according to one embodiment of the invention. FIG. 4 shows clients 22-3 and 22-4 (instances of the client 22 of FIG. 1), and network elements 24-3, 24-4, and 24-5 (instances of the network element 24 of FIG. 1). The client 22-3 has performed a process of transferring and installing a version of the management software 30 from the network element 24-3 as shown by the download communication path 44 through the intranet 26, in a process generally similar to the process illustrated for transferring management software 30 between the client 22-1 and network element 24-1 in FIGS. 2A, 2B, and 2C. Client 22-3 establishes an execution communication path 52-1 through the intranet 26 between the client 22-3 and network element 24-4 for executing the site management software 30 (downloaded from network element 24-3) to configure and manage network element 24-4. The client 22-3 also establishes an execution communication path 52-2 through the intranet 26 between the client 22-3 and network element 24-5 for executing the site management software 30 (downloaded from network element 24-3) to configure and manage the network element 24-5. Thus, the management software 30 that is retrieved from one network element (e.g., 24-3) is used to manage one or more additional network elements (e.g. 24-4, 24-5), thus avoiding the need to download multiple versions of the Java applications 30 that are unnecessary or redundant.

Figure 5:
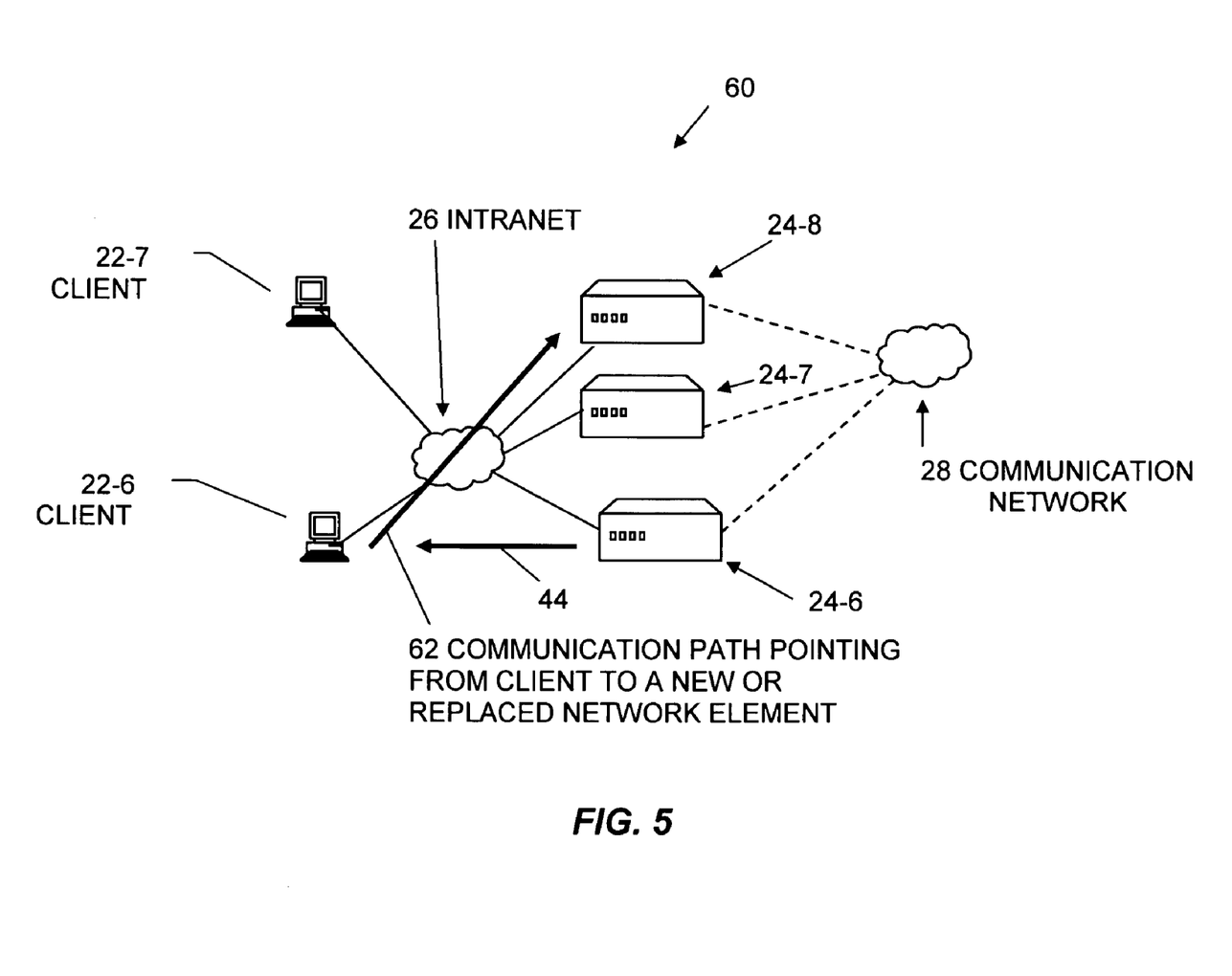
FIG. 5 is an illustration of a complex networked environment showing the establishment of a communication path to a newly installed network element according to one embodiment of the invention.

Alternatively, if a user communicates with a new (or replacement) version of a network element 24 having a different version of the management software than the transferred version of the management software 30 that is already available on the client 22, a corresponding version of the management software 30 corresponding to the new network element 24 is received, as described in particular for FIG. 5.

FIG. 5 is an illustration of a complex networked environment 60 showing the establishment of a communication path 62 to transfer management software 30 according to one embodiment of the invention. FIG. 5 shows clients 22-6 and 22-7 (instances of the client 22 of FIG. 1), and network elements 24-6, 24-7, and 24-8 (instances of the network element 24 of FIG. 1). The client 22-6 has performed a process of transferring and installing a version of the management software 30 from the network element 24-6 as shown by download communication path 44 through the intranet 26, in a process generally similar to the process illustrated for transferring management software 30 between the client 22-1 and network element 24-1 in FIGS. 2A, 2B, and 2C. However, network element 24-8 has loaded a different version of the management software load 36 than the version provided by the network element 24-6. In one example, client 22-6 establishes an initial communication path 62 through the intranet 26 pointing from the client 22-6 to a newly installed (or replaced) network element 24-8. This pointing results in a download of a transferred version of the management software 30 from the network element 24-8 to the client 22-6 that is proper for configuring and managing the network element 24-8. The client 22-6 is capable of running two different versions of the management software 30 at the same time (e.g., one version from the network element 24-6 and another version from the network element 24-8).

Thus, if a new version of a network element 24-8 is introduced to the communications network 28 (that is, a replacement of an existing network element 24 or addition of a new network element 24 to the communication network 28), a copy of the associated management software 30 need not be manually distributed to all of the users (that is, clients 22, such as clients 22-6 and 22-7) that potentially will use the new network element 24-8. Instead, when a user at client 22-6 connects to the new network element 24-8, the proper management software 30 is automatically provided.

In one example of an embodiment of the invention, a user enters a URL (Uniform Resource Locator) corresponding to the network element 24 into a browser (e.g., Internet Explorer) executing on the client 22 so that a communications channel (e.g., 42, 62) is established through an intervening network, such as an intranet 26, to the network element 24. Alternatively, the client 22 can be directly coupled to an Ethernet port on the network element 24. In another embodiment, the client 22 communicates with the network element 24 through the Internet (e.g., the intranet 26 represents the global Internet). The transport mechanism between the network element 24 and the client 22 can be FTP based. In an alternative embodiment, the network element 24 functions as an HTTP (Hypertext Transfer Protocol) server.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of enabling a client to manage at least two network elements of a communications network, the method comprising, at each network element:

determining whether a version of the management software that is proper for managing the network element is already installed on the client;

if a version of the management software that is proper for managing the network element is already installed on the client, enabling the client to manage the network element using the already installed version of the management software; and     if a version of the management software that is proper for managing the network element is not already installed on the client, transferring to the client a current version of the management software that is proper for managing the network element, and enabling the client to manage the network element using the current version of the management software.

2. The method as claimed in claim 1, wherein the step of determining whether a version of the management software that is proper for managing the network element is already installed on the client is performed in response to a request message received from the client.

3. The method as claimed in claim 2, wherein the request message received from the client includes an identification of the version of any management software already installed on the client.

4. A network element of a communications network, the network element comprising:
   a processor;
   a computer-readable medium storing a master software load for controlling operation of the processor, the master software load including software instructions for:
   determining whether a version of the management software that is proper for managing the network element is already installed on the client;
   if a version of the management software that is proper for managing the network element is already installed on the client, enabling the client to manage the network element using the already installed version of the management software; and
   if a version of the management software that is proper for managing the network element is not already installed on the client, transferring to the client a current version of the management software that is proper for managing the network element, and enabling the client to manage the network element using the current version of the management software.

5. The network element as claimed in claim 4, wherein the software instructions for determining whether a version of the management software that is proper for managing the network element is already installed on the client are responsive to a request message received from the client.

6. The network element as claimed in claim 5, wherein the request message received from the client includes an identification of the version of any management software already installed on the client.

* * * * *